United States Patent Office 2,957,761
Patented Oct. 25, 1960

2,957,761

METHOD AND COMPOSITION FOR THE TREATMENT OF SOIL

Edwin A. Davis, Westminster, Calif., assignor to The Dow Chemical Company, Midland, Mich., a corporation of Delaware No Drawing. Filed Jan. 9, 1957, Ser. No. 633,193

9 Claims. (Cl. 71—2.7)

The present invention relates to the treatment of soil and is particularly concerned with a method and composition for improving the plant growing properties of soil and for controlling soil-inhabiting life forms including invertebrate organisms and germinative seeds and emerging seedlings.

The introduction of chemical materials into the soil offers an excellent method for the control of various life forms and organisms found therein. However, the utilization of such a method has been most generally hampered by the limited variety of organisms against which most materials are effective. This means that soil which is infested with a variety of life forms must be subjected to multiple treatments with different toxicant materials in order to obtain the desired control. It would be desirable, for example, to be able to treat soil with a single toxicant to free it of such diverse organisms as germinative seeds and emerging seedlings and invertebrate organisms including wireworms, nematodes and fungi.

It is an object of the present invention to provide a new method and composition for the fumigation of soil. A further object is to provide an improved method and composition for the suppression of the growth of undesirable vegetation. Another object is the provision of a new method and composition for the control of soil-dwelling invertebrate organisms such as fungi, wireworms and root-knot nematodes. An additional object is the provision of an improved method and composition for substantially freeing soil or growth media of germinative and germinant seeds prior to the planting of the crop. A further object is to provide a method for treating soil which will improve the plant growing properties of the soil and the growth characteristics of plants subsequently planted therein. Yet another object is the provision of new compositions adapted to be employed for the treatment of soil. Other objects will become apparent from the following specification and claims.

According to the present invention, it has been discovered that soil-inhabiting organisms such as fungi, wireworms and root-knot nematodes, and germinative seeds and emerging seedlings may be controlled by distributing 4-chloro-2-butyn-1-ol or 4-bromo-2-butyn-1-ol through soil. It has been further discovered that such distribution accomplishes changes in the soil which stimulate the growth and improve the growth characteristics of crops subsequently planted therein. For the control of invertebrate organisms, a parasiticidal amount of the butyn-1-ol compounds is employed, while for the control of germinative seeds and emerging seedlings the butyn-1-ol compounds are employed in a growth-inhibiting amount. Where improved growth characteristics and enhanced crop yields are concerned, the above amounts of the butyn-1-ol compounds induce soil changes effecting such improved and beneficial results. Thus, for example, crop plants raised on such fumigated soil have more luxuriant tops and roots and are of a greater total weight than those normally obtained from untreated soil.

4-chloro-2-butyn-1-ol and 4-bromo-2-butyn-1-ol are mobile liquids boiling at about 78° C. at 5 millimeters pressure and 69° C. at 1 millimeter pressure, respectively, somewhat soluble in many organic solvents and of low solubility in water. The butyn-1-ol compounds are adapted to be readily and conveniently distributed in soil. Further, when so employed, the compounds accomplish a rapid control of invertebrate organisms and induce soil changes which improve the growth characteristics of crops later raised in the treated soil. In addition, the compounds also suppress the growth of germinant seeds and emerging seedlings. It is among the advantages of the present invention that these desirable and beneficial results are obtained in sand, silt and clay type soils. It is a further advantage that the compounds, while sufficiently persistent to accomplish the desired effect upon soil-inhabiting life forms such as invertebrate organisms and germinant seeds and emerging seedlings, or to achieve the changes in the soil which accomplish improved growth characteristics, dissipate in a reasonable period of time. Yet another advantage is that the butyn-1-ol compounds permeate soil for a distance of several inches from the point of application depending upon the temperature, moisture content, compactness and physical consistency of the soil or growth media.

The distribution of at least a minimum effective dosage of the butyn-1-ol compounds in soil is essential for the practice of the present invention. In general, good controls of invertebrate organisms and germinative seeds are obtained when the compounds are distributed in the soil in the amount of from about 4 to 160 parts or more by weight per million parts by weight of soil. Where improved growth characteristics of crops are concerned, these same concentrations are particularly effective, although lower concentrations are sometimes effective.

In field applications, the butyn-1-ol compounds may be distributed in the soil at a dosage of from about 5 to 200 pounds or more per acre, and through such a cross-section of the soil as to provide for the presence therein of an effective concentration of the treating agent. In such applications, it is desirable that the compounds be distributed to a depth of at least 2 inches. When the treatment is carried out by injection or drilling techniques, it is preferred that the maximum distance between deposits be not materially in excess of 20 inches when the dosage is 20 pounds or more of toxicant per acre, and not materially in excess of 10 inches when the dosage is 5 pounds per acre, such maximum distance between deposits being directly proportional to the dosage of the butyn-1-ol compound within the extremes recited.

The method of the present invention may be carried out by distributing the unmodified 4-chloro-2-butyn-1-ol or 4-bromo-2-butyn-1-ol in growth media. However, the present method also embraces the employment of liquid or dust compositions containing the toxicant. In such usage, the toxicant compounds may be modified with one or a plurality of additaments or soil treating adjuvants including water or other liquid carriers, surface-active dispersing agents and finely divided inert solids. Depending upon the concentration of toxicant, such augmented compositions are adapted to be distributed in soil or to be employed as concentrates and subsequently diluted with additional inert carrier to produce the ultimate treating compositions.

The exact concentration of the 4-chloro-2-butyn-1-ol or 4-bromo-2-butyn-1-ol to be employed in the treating composition is not critical and may vary considerably provided the required dosage of toxicant is supplied in the growth medium. The concentration of toxicant in organic solvent compositions employed to supply the desired dosage generally is from about 10 to 85 percent by weight. With aqueous compositions, the required dosage is generally supplied with compositions containing from 0.2 to 50 percent by weight, although concentrations of 0.0002 percent by weight conveniently may be employed in irrigation treatments of soil. In dusts, the concentration of toxicant may be from about 1 to 50 percent by weight, although concentrations as low as 0.1 percent by weight are sometimes employed. In compositions to be employed as concentrates, the toxicants may be present in a concentration of from 5 to 95 percent by weight.

The quantity of treating composition to be applied may vary considerably provided that the required dosage of active ingredient is applied in sufficient amount of the finished composition to facilitate the penetration and distribution of said ingredient in growth media. The required amount of the active ingredient in the soil conveniently may be supplied per acre treated in from 10 to 27,000 gallons or more of the liquid carrier or in from 50 to 2,000 pounds of inert solid carrier.

Liquid compositions containing the desired amount of active ingredient may be prepared by dispersing the toxicants in water or an organic liquid with or without the aid of a suitable surface-active dispersing agent such as an ionic or non-ionic emulsifying agent. The surface-active dispersing agents are generally employed in the amount of from 1 to 20 percent by weight of the combined weight of the butyn-1-ol compound and surface-active agent in the composition. Suitable organic liquid carriers include acetone, methylene chloride, chlorobenzene and the petroleum distillates such as diesel fuel, kerosene, fuel oil, naphthas and Stoddard solvent. Among the latter, the petroleum distillates boiling almost entirely under 400° F. at atmospheric pressure and having a flash point above 80° F. are generally preferred. The aqueous compositions may contain a small amount of a water-immiscible solvent as a solvent for the toxicant ingredient. In such compositions, the carrier comprises an aqueous emulsion, namely, a mixture of water, emulsifying agent and organic liquid. In the liquid compositions, the choice of dispersing and emulsifying agent and the amount thereof employed are dictated by the nature of the composition and by the ability of the agent to facilitate the dispersion of the toxicant compound in the carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the active ingredient is dispersed in and on a finely divided inert solid such as clay, talc, chalk, gypsum and the like. In such operations, the finely divided carrier is mechanically mixed or ground with the 4-chloro-2-butyn-1-ol or 4-bromo-2-butyn-1-ol. Similarly, dust compositions containing the toxicant compounds may be prepared from various solid surface-active dispersing agents such as bentonite, fuller's earth, attapulgite and other clays. Depending upon the proportions of ingredients, these dust compositions may be employed as concentrates and subsequently diluted with additional solid surface-active dispersing agent or with chalk, talc or gypsum and the like to obtain the desired amount of active ingredient in a composition adapted to be employed for the treatment of soil. Also, such dust compositions may be dispersed in water with or without the aid of a dispersing agent to form spray mixtures.

When operating in accordance with the present invention, the 4-chloro-2-butyn-1-ol or 4-bromo-2-butyn-1-ol is dispersed in soil or growth media in any convenient fashion, e.g. by simply mixing with the soil, by applying to the surface of the soil and thereafter dragging or disking into the soil to the desired depth, by employing a liquid carrier to accomplish the penetration and impregnation or by injection or drilling techniques whereby the toxicant is deposited beneath the surface of the soil.

In a further method, the distribution of the 4-chloro-2-butyn-1-ol or 4-bromo-2-butyn-1-ol in soil may be accomplished by introducing the toxicants in the water employed to irrigate the soil. In such procedures, the amount of water may be varied with the porosity and water-holding capacity of the soil to obtain the desired depth of distribution of the toxicants.

The following examples illustrate the invention but are not to be construed as limiting:

*Example 1*

25 parts by weight of 4-chloro-2-butyn-1-ol or 4-bromo-2-butyn-1-ol, 65 parts of xylene and 5 parts of an alkylated aryl polyether alcohol (Triton X-100) are mechanically mixed together to prepare concentrate compositions in the form of emulsifiable liquids.

Also, 25 parts by weight of 4-chloro-2-butyn-1-ol or 4-bromo-2-butyn-1-ol are mechanically mixed with 4 parts of Triton X-100 to prepare water-dispersible concentrate compositions.

In a further operation, 25 parts by weight of 4-chloro-2-butyn-1-ol or 4-bromo-2-butyn-1-ol, 70 parts of fuller's earth, 3 parts of an alkyl aryl sulfonate (Nacconal NR) and 2 parts of a polymerized sodium salt of a substituted benzoid alkyl sulfonic acid (Daxad No. 27) are mechanically mixed to prepare concentrate compositions in the form of wettable powders.

These concentrate compositions are adapted to be dispersed in water to prepare aqueous compositions which have very desirable penetrating and wetting properties. The latter aqueous compositions are adapted to be employed to distribute effective concentrations of the toxicant compounds in soil.

*Example 2*

4-chloro-2-butyn-1-ol was dispersed in an acetone solution containing 4 parts by volume of polyethylene glycol oleate (Prosol 1001A) to produce a concentrate composition containing 23.2 grams of the butyn-1-ol compound per liter of ultimate mixture. Portions of this concentrate composition were dispersed in water to prepare aqueous emulsion compositions containing 0.18, 0.09, 0.045 and 0.023 gram of 4-chloro-2-butyn-1-ol per 280 milliliters of ultimate mixture. These compositions were employed for the treatment of areas of soil and observations made of the control of the growth of seeds and emerging seedlings of various grass species and broad leaf plants. The grass species included canary grass and oats whereas the broad leaf species were rape and cotton. In the determinations, the compositions were employed to treat soil areas which had been prepared and seeded with the named plant species. In the treating operations, the compositions were applied as a soil drench and at a rate of about 0.25 acre inch of composition per acre to supply substantially uniform dosages of 40, 20, 10 and 5 pounds of 4-chloro-2-butyn-1-ol per acre. These dosages correspond to concentrations of about 120, 60, 30 and 15 parts, respectively, by weight of the butyn-1-ol compound per million parts by weight of soil. Other areas similarly seeded with the named plant species were left untreated to serve as checks.

After 26 days, the treated areas were examined to ascertain what control of the growth of the seeds and emerging seedlings had been obtained. The results are set forth in the following table:

| Seed Species | Percent Control of Growth of Seeds and Emerging Seedlings at Indicated Dosages of Toxicant in Pounds Per Acre | | | |
|---|---|---|---|---|
| | 5 | 10 | 20 | 40 |
| Rape | 24 | 62 | 99 | 100 |
| Cotton | 91 | 100 | 100 | 100 |
| Canary Grass | 57 | 79 | 99 | 100 |
| Oats | 64 | 99 | 100 | 100 |

At the time of the observations, the check areas were found to show vigorously growing stands of all the named plant species. A second planting for all treatments was made 28 days after the initial treatment. On this planting abundant and vigorous stands of the named plant species grew in both the treated soil and untreated checks.

Example 3

4-bromo-2-butyn-1-ol was dispersed in an acetone solution containing 4 parts by volume of Prosol 1001A to produce a concentrate composition containing 23.2 grams of the butyn-1-ol compound per liter of ultimate mixture. A portion of this concentrate composition was dispersed in water to prepare an aqueous composition containing 0.09 gram of 4-chloro-2-butyn-1-ol per 280 milliliters of ultimate mixture. This composition was employed for the treatment of areas of soil and observations made of the control of the growth of seeds and emerging seedlings of various grass species and broad leaf plants. The grass species included canary grass and oats whereas the broad leaf species were rape and cotton. In the determinations, the compositions were employed to treat soil areas which had been prepared and seeded with the named plant species. In the treating operations, the composition was applied as a soil drench at a rate of 0.25 acre inch of composition per acre to supply a substantially uniform dosage of 20 pounds of 4-bromo-2-butyn-1-ol per acre. This dosage corresponds to a concentration of about 60 parts by weight of the butyn-1-ol compound per million parts by weight of soil. Other areas similarly seeded with the named plant species were left untreated to serve as checks.

After 26 days, the treated areas were examined to ascertain what control of the growth of the seeds and emerging seedlings had been obtained. The results are set forth in the following table:

| Seed Species | Percent Control of Growth of Seeds and Emerging Seedlings at a Dosage of 20 Pounds of Toxicant Per Acre |
|---|---|
| Rape | 100 |
| Cotton | 98 |
| Canary Grass | 100 |
| Oats | 100 |

At the time of observation, the check areas were found to show vigorously growing stands of all the named plant species. A second planting for all treatments was made 28 days after the initial treatment. On this planting abundant stands of the named plant species grew in both the treated soil and the untreated checks.

Example 4

4-chloro-2-butyn-1-ol was employed for the treatment of sandy loam soil heavily infested with the fungus organisms *Fusarium solani*, *Pythium* and *Rhizoctonia solani*. In the treating operations, the soil was placed in sealable containers and thereafter injected with an acetone solution containing 15 grams of 4-chloro-2-butyn-1-ol per liter of ultimate mixture in an amount sufficient to supply a concentration of 25 parts by weight of 4-chloro-2-butyn-1-ol per million parts by weight of soil. The containers of treated soil were incubated at an average temperature of about 25° C. In a check operation, sealed containers containing the above infested but untreated soil were exposed to the same conditions as the treated soil.

After 3 days, the containers were unsealed and portions of the treated and untreated soil cultured by the dilution plate method as described by J. P. Martin in "Soil Science," 69, No. 3, pp. 215–32 (March 1950) to determine the percent control of fungal organisms. In the latter operations, the culturing medium employed was a peptone-dextrose agar (1000 milliliters of water, 10 grams of dextrose, 5 grams of peptone, 1 gram of $KH_2PO_4$, 0.5 gram of $MgSO_4 \cdot 7H_2O$, and 20 grams of agar) containing 0.069 gram of rose bengal and 0.030 gram of streptomycin per liter of ultimate mixture. In the plating operations, the culturing medium was inoculated with about 0.5 gram of soil sample per liter of medium and the plates thereafter poured in replicates of 3 for each of the treated and check soils. The poured plates were then incubated for 5 days at 25° C.

After incubation, the plates were examined and the counts of fungal colonies made in order to determine the percent control of the test organisms. The examination showed that a 97 percent control of the fungal organisms had been obtained in the treated soil. At the time of the observations, the plates prepared from the medium inoculated with untreated check soil were found to support a heavy growth of the complex of root rot fungi.

Example 5

In another operation, seed beds of sandy loam soil which were heavily infested with root-knot nematodes were treated with aqueous solutions containing 40 and 80 parts by weight of 4-chloro-2-butyn-1-ol per million parts of ultimate mixture. In the treating operations, the compositions were applied to the soil areas as a soil drench and at a rate of 5.7 acre inches of aqueous composition per acre to supply 6.6 and 13 parts by weight of toxicant per million parts by weight of soil, respectively.

About 10 days after treatment, the soil was seeded with cucumbers to serve as host plants for the nematodes. Untreated check plots were also planted with cucumber seeds. During the growing period, there was observed no adverse effect upon the growth of seedlings attributable to the presence of residual fumigant. Four weeks after seeding, the plants were lifted from the soil, the roots washed and the latter examined for gall formation attributable to nematode attack. The results obtained are shown in the following table:

| Dosage of Toxicant in Parts by Weight of 4-Chloro-2-Butyn-1-ol per Million Parts by Weight of Soil | Percent Control of Nematodes |
|---|---|
| 6.6 | 99 |
| 13.0 | 100 |

In the check plots which received no treatment, the plants were stunted and the roots covered with galls attributable to nematode attack.

The expressions "growth media" and "soil" are herein employed in their broadest sense to be inclusive of all conventional "soils" as defined in Webster's New International Dictionary, second edition, unabridged, published in 1937 by G. and C. Merriam Company, Springfield, Massachusetts. Thus, the terms refer to any solid substance or media in which vegetation may take root and grow and are intended to include not only earth, but also compost, manure, muck, humus, sand and the like adapted to support plant growth.

I claim:

1. A method useful for improving the plant growing properties of soil which comprises impregnating soil with an active ingredient in the amount of at least 4 parts by weight per million parts by weight of the soil, the active ingredient being selected from the group consisting of 4-chloro-2-butyn-1-ol and 4-bromo-2-butyn-1-ol.

2. A method for controlling soil-dwelling nematodes and fungi which comprises impregnating soil with a parasiticidal amount of a compound selected from the group consisting of 4-chloro-2-butyn-1-ol and 4-bromo-2-butyn-1-ol.

3. A method for controlling the growth of germinant seeds and emerging seedlings which comprises impregnating soil with a growth inhibiting amount of a compound selected from the group consisting of 4-chloro-2-butyn-1-ol and 4-bromo-2-butyn-1-ol.

4. A method useful for improving the plant growing properties of soil which comprises impregnating soil with a composition comprising a soil treating adjuvant in admixture with an active ingredient selected from the group consisting of 4-chloro-2-butyn-1-ol and 4-bromo-2-butyn-1-ol, the impregnation being carried out to provide at least 4 parts by weight of the active ingredient per million parts by weight of soil.

5. A composition useful for improving the plant growing properties of soil which comprises a compound selected from the class consisting of 4-chloro-2-butyn-1-ol and 4-bromo-2-butyn-1-ol as an active ingredient in intimate admixture with an adjuvant selected from the group consisting of (A) inert finely divided solids, (B) emulsifying and dispersing agents and (C) petroleum distillates, the amount of such adjuvants employed in the compositions being from 50 to 99 percent by weight for (A), from 1 to 20 percent by weight for (B), and from 15 to 90 percent by weight for (C).

6. A composition useful for improving the plant growing properties of soil claimed in claim 5 wherein the active toxic ingredient is admixed wth a surface-active dispersing agent.

7. A composition useful for improving the plant growing properties of soil claimed in claim 5 wherein the active toxic ingredient is admixed with a finely divided inert solid.

8. A composition useful for improving the plant growing properties of soil claimed in claim 5 wherein the active toxic ingredient is admixed with a petroleum distillate.

9. A composition for the suppression of the growth of vegetation which comprises an aqueous dispersion of the composition claimed in claim 6, the active toxic ingredient being present in the amount of at least 0.0002 percent by weight.

References Cited in the file of this patent

UNITED STATES PATENTS

| | | |
|---|---|---|
| 2,106,181 | Kreimeier | Jan. 25, 1938 |
| 2,749,377 | Johnston | June 5, 1956 |
| 2,794,727 | Barrons | June 4, 1957 |
| 2,801,160 | Iserson | July 30, 1957 |
| 2,836,536 | Meuli | May 27, 1958 |

FOREIGN PATENTS

| | | |
|---|---|---|
| 913,365 | France | Sept. 5, 1946 |

OTHER REFERENCES

U.S. Dept. of Agri. Tech. Bulletin #162, March 1929, pp. 47 and 48.